(12) United States Patent
Zhang

(10) Patent No.: US 11,297,577 B2
(45) Date of Patent: Apr. 5, 2022

(54) POWER CONTROL METHOD AND DEVICE

(71) Applicant: HUAWEI TECHNOLOGIES CO., LTD., Guangdong (CN)

(72) Inventor: Lili Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/990,751

(22) Filed: Aug. 11, 2020

(65) Prior Publication Data

US 2020/0374807 A1    Nov. 26, 2020

Related U.S. Application Data

(63) Continuation of application No. PCT/CN2019/077181, filed on Mar. 6, 2019.

(30) Foreign Application Priority Data

Mar. 9, 2018  (CN) .......................... 201810196479.9

(51) Int. Cl.
*H04W 72/04*  (2009.01)
*H04W 52/14*  (2009.01)
(Continued)

(52) U.S. Cl.
CPC ......... *H04W 52/146* (2013.01); *H04L 5/0051* (2013.01); *H04L 5/0092* (2013.01);
(Continued)

(58) Field of Classification Search
CPC . H04W 52/146; H04W 52/10; H04W 52/325; H04W 52/286; H04W 52/243;
(Continued)

(56) References Cited

U.S. PATENT DOCUMENTS

2014/0078939 A1* 3/2014 Shirani-Mehr ..... H04W 52/241
370/277
2015/0133179 A1* 5/2015 Li ....................... H04W 52/146
455/522

(Continued)

FOREIGN PATENT DOCUMENTS

CN   102917436 A   2/2013
CN   105191448 A   12/2015
(Continued)

OTHER PUBLICATIONS

3GPP TS 38.213 V15.0.0 (Dec. 2017), 3rd Generation Partnership Project; Technical Specification Group Radio Access Network; NR; Physical layer procedures for control(Release 15), Dec. 2017. total 56 pages.

(Continued)

*Primary Examiner* — Hassan Kizou
*Assistant Examiner* — Mahbubul Bar Chowdhury
(74) *Attorney, Agent, or Firm* — Womble Bond Dickinson (US) LLP

(57) ABSTRACT

Embodiments of this application describe a power control method and a device, and relate to the field of communications technologies. A network device operating in a full-duplex mode can correctly receive data during data sending. The method may include receiving, by user equipment (UE), power control parameter information of an uplink transmit power from a network device, where the power control parameter information includes first power control parameter information and second power control parameter information, the first power control parameter information is used to calculate an uplink transmit power for data transmission on a non-full-duplex resource, and the second power control parameter information includes a parameter for calculating an uplink transmit power for data transmission on a full-duplex resource. The method may also include determining, (Continued)

by the UE, an uplink transmit power based on the power control parameter information and a resource type used for uplink transmission, where the resource type includes a full-duplex resource and a non-full-duplex resource.

16 Claims, 4 Drawing Sheets

(51) Int. Cl.
*H04W 4/70* (2018.01)
*H04L 5/00* (2006.01)
*H04L 5/14* (2006.01)
*H04L 25/02* (2006.01)
*H04W 52/08* (2009.01)
*H04W 74/08* (2009.01)
*H04W 80/02* (2009.01)

(52) U.S. Cl.
CPC ............ *H04L 5/14* (2013.01); *H04L 25/0226* (2013.01); *H04W 4/70* (2018.02); *H04W 52/08* (2013.01); *H04W 72/0493* (2013.01); *H04W 74/0833* (2013.01); *H04W 80/02* (2013.01)

(58) Field of Classification Search
CPC ....... H04W 52/14; H04W 4/70; H04W 52/08; H04W 72/0493; H04W 74/0833; H04W 80/02; H04L 5/0051; H04L 5/0091; H04L 5/0092; H04L 5/14; H04L 25/0226; H04B 1/56

See application file for complete search history.

(56) References Cited

U.S. PATENT DOCUMENTS

| | | | |
|---|---|---|---|
| 2017/0041121 A1* | 2/2017 | Noh | H04W 52/243 |
| 2017/0048039 A1* | 2/2017 | Zhao | H04L 25/0226 |
| 2017/0078971 A1* | 3/2017 | Noh | H04L 5/14 |
| 2017/0215149 A1* | 7/2017 | Zhang | H04W 52/325 |
| 2019/0037502 A1* | 1/2019 | Tang | H04W 52/243 |
| 2019/0191381 A1 | 6/2019 | Zhang et al. | |
| 2020/0396691 A1* | 12/2020 | Wernersson | H04W 52/08 |
| 2021/0211993 A1* | 7/2021 | Liu | H04W 52/54 |

FOREIGN PATENT DOCUMENTS

| | | |
|---|---|---|
| CN | 107026689 A | 8/2017 |
| CN | 107277908 A | 10/2017 |
| CN | 107295620 A | 10/2017 |
| EP | 3429281 A1 | 1/2019 |
| WO | 2012136081 A1 | 10/2012 |
| WO | 2017173920 A1 | 10/2017 |
| WO | 2017181321 A1 | 10/2017 |

OTHER PUBLICATIONS

Vivo, "Remaining issues on NR UL power control", 3GPP TSG RAN WG1 Meeting #92, R1-1801546, Athens, Greece, Feb. 26-Mar. 2, 2018, total 5 pages.

* cited by examiner

POWER CONTROL METHOD AND DEVICE

CROSS-REFERENCE TO RELATED APPLICATIONS

This application is a continuation of International Application No. PCT/CN2019/077181, filed on Mar. 6, 2019, which claims priority to Chinese Patent Application No. 201810196479.9, filed on Mar. 9, 2018. The disclosures of the aforementioned applications are hereby incorporated by reference in their entireties.

TECHNICAL FIELD

This application relates to the field of communications technologies, and in particular, to a power control method and a device.

BACKGROUND

In a mobile communications system, uplink/downlink data transmission modes may be classified into time division duplex (TDD), frequency division duplex (FDD), full-duplex (FD), and other modes. In the TDD mode, data receiving and sending are performed at different time. For example, in the TDD mode, some slots are used for downlink transmission, while some other slots are used for uplink transmission. In the FDD mode, data receiving and sending are performed in different frequency bands. For example, in the FDD mode, uplink data is transmitted in an uplink frequency band, while downlink data is transmitted in a downlink frequency band. In the full-duplex mode, uplink and downlink transmission can be performed by using a same frequency band at the same time. Among full-duplex networking scenarios, a typical scenario is that a network device has a full-duplex capability and can perform data receiving and sending by using a same frequency band at the same time; and a terminal device has no full-duplex capability and communicates with the network device in a TDD mode.

In prior approaches, power control solutions are available for both a long term evolution (LTE) system and a next radio (NR) system, but the existing power control solutions do not take the full-duplex mode into account. In the NR system, a full-duplex networking mode is widely applied. A network device that operates in the full-duplex mode receives data from a group of terminal devices in an uplink direction, and in the meantime, sends data to another group of terminal devices in a downlink direction. Consequently, a self-interference cancelation problem exists. Different from common uplink transmission, the network device in the full-duplex mode requires a higher receive power during data receiving to cope with residual self-interference. This imposes a new requirement on transmit power control for uplink transmission of the terminal devices. Therefore, a power corresponding to a specific resource in the full-duplex mode needs to be correctly set. Affected by imprecise power control, the network device that operates in the full-duplex mode may perform receiving incorrectly and cannot effectively cope with self-interference.

SUMMARY

Embodiments of this application provide a power control method and a device, to implement uplink transmit power control in a full-duplex system, so that a network device that operates in a full-duplex mode can correctly receive data during data sending.

To achieve the foregoing objective, the following technical solutions are used in the embodiments of this application.

According to a first aspect, this application provides a power control method and user equipment.

In a possible embodiment, the method may include: receiving, by the user equipment (UE), power control parameter information of an uplink transmit power from a network device, where the power control parameter information includes first power control parameter information and second power control parameter information, the first power control parameter information is used to calculate an uplink transmit power for data transmission on a non-full-duplex resource, and the second power control parameter information includes a parameter for calculating an uplink transmit power for data transmission on a full-duplex resource; and determining, by the UE, an uplink transmit power based on the power control parameter information and a resource type used for uplink transmission. In this way, different power control parameters are configured based on different resource types, and a separate power control parameter is configured for the full-duplex resource, so that the UE can send data with different uplink transmit powers by using different resource types; and the network device that operates in a full-duplex mode overcomes a self-interference problem, to correctly receive data during data sending.

In a possible embodiment, the second power control parameter information includes at least one second power control parameter, and one second power control parameter is related to at least one of: a channel type of uplink transmission, a service type of uplink transmission, transmission content of uplink transmission, a beam corresponding to uplink transmission, a carrier corresponding to uplink transmission, and a bandwidth part (BWP) corresponding to uplink transmission. By using this method, power control parameters can be configured based on different granularities, achieving more precise uplink transmit power control.

In a possible embodiment, the channel type includes at least one of a physical uplink shared channel (PUSCH), a physical uplink control channel (PUCCH), a physical random access channel (PRACH), and a sounding reference signal (SRS); and the service type includes at least one of an enhanced mobile broadband (eMBB), ultra-reliable and low latency communications (URLLC), and enhanced machine type communication (eMTC). The channel type and the service type are not limited in this application. The manner described in this possible embodiment is merely used as an example, and this application is not limited thereto during specific implementation.

In a possible embodiment, the second power control parameter information is at least one of third power control parameter information and fourth power control parameter information, where the third power control parameter information is determined based on a first interference cancelation capability of the network device, and the fourth power control parameter information is determined based on a second interference cancelation capability of the network device. By using this method, a plurality of sets of power control parameters may be configured for one UE, and the uplink transmit power may be adjusted based on a self-interference cancelation capability of the network device or other constraints and by using different power control parameters in different cases, to satisfy an uplink power control requirement in a full-duplex networking scenario.

In a possible embodiment, the full-duplex resource includes at least one of a time domain resource, a frequency domain resource, and a space domain resource. The time domain resource includes a super frame, a frame, a slot, a subframe, a micro-subframe, a micro-slot, an orthogonal frequency division multiplexing (OFDM) symbol, a mini-slot, or a mini-subframe, or includes any combination of a super frame, a frame, a slot, a subframe, a micro-subframe, a micro-slot, an OFDM symbol, a mini-slot, and a mini-subframe; the frequency domain resource includes a control channel element (CCE), a control resource set (CORSET), a physical resource block (PRB), a BWP, or a carrier; and the space domain resource includes a beam, a beam pair, a beam group, or an antenna port. A division manner of the full-duplex resource is not limited in this application. The manner described in this possible embodiment is merely used as an example, and this application is not limited thereto during specific implementation.

In a possible embodiment, the UE receives the power control parameter information of the uplink transmit power from the network device by using at least one of radio resource control (RRC) signaling, media access control (MAC) signaling, or physical layer signaling.

In a possible embodiment, the first power control parameter information includes fifth power control parameter information and sixth power control parameter information, where the fifth power control parameter information is used to calculate an uplink transmit power for data transmission on an uplink non-full-duplex resource, and the sixth power control parameter information is used to calculate an uplink transmit power for data transmission on a flexible duplex resource. By using this method, the non-full-duplex resource is further divided into the uplink non-full-duplex resource and the flexible duplex resource. In this case, different power control parameters are configured for the uplink non-full-duplex resource and the flexible duplex resource.

In a possible embodiment, the UE receives first indication information sent by the network device, where the first indication information includes closed-loop power control process indication information, and the closed-loop power control process indication information is used to indicate that a closed-loop power control process includes a closed-loop power control process used for full-duplex. By using this method, after determining that a plurality of closed-loop power control processes are configured, the UE can differentiate, in a closed-loop power control process in an accumulation mode, between accumulative closed-loop power control parameters corresponding to different resource types, so that an uplink power control process is more accurate.

In a possible embodiment, the first indication information further includes power control adjustment status indication information, where the power control adjustment status indication information is used to indicate a value range of the closed-loop power control process indication information.

In a possible embodiment, if the resource type used by the UE for uplink transmission changes, the UE redetermines the power control parameter based on the power control parameter information and/or redetermines a type of the closed-loop power control process based on the first indication information. By using this method, an uplink power control process is more accurate.

In a possible embodiment, if the closed-loop power control process is an accumulation mode, a closed-loop power control parameter is accumulated based on a closed-loop power control parameter value corresponding to a previous resource unit whose resource type is the same as that of a current resource unit, where the closed-loop power control parameter is used to determine the uplink transmit power. By using this method, the closed-loop power control process is more accurate.

Correspondingly, this application further provides a power control apparatus. The apparatus can implement the power control method according to the first aspect. For example, the apparatus may be user equipment, and can implement the foregoing method by using software or hardware, or by using hardware executing corresponding software.

In a possible embodiment, the apparatus may include a processor and a memory. The processor is configured to support the apparatus in executing corresponding functions in the method according to the first aspect. The memory is configured to be coupled with the processor, and stores program instructions and data necessary for the apparatus. In addition, the apparatus may further include a communications interface, configured to support communication between the apparatus and another network element. The communications interface may be a transceiver.

In a possible embodiment, the apparatus may include a receiving module and a determining module. The receiving module is configured to receive power control parameter information of an uplink transmit power from a network device, where the power control parameter information includes parameter information used to calculate an uplink transmit power for data transmission on a non-full-duplex resource and parameter information used to calculate an uplink transmit power for data transmission on a full-duplex resource. The determining module is configured to determine an uplink transmit power based on the power control parameter information and a resource type used for uplink transmission.

According to a second aspect, this application provides another power control method and apparatus.

In a possible embodiment, the method may include: sending, by a network device, power control parameter information of an uplink transmit power to UE, where the power control parameter information includes first power control parameter information and second power control parameter information, the first power control parameter information is used to calculate an uplink transmit power for data transmission on a non-full-duplex resource, and the second power control parameter information includes a parameter for calculating an uplink transmit power for data transmission on a full-duplex resource. In this way, the network device configures different power control parameters based on different resource types, and configures a separate power control parameter for the full-duplex resource, so that the network device that operates in a full-duplex mode overcomes a self-interference problem, to correctly receive data during data sending.

In a possible embodiment, the second power control parameter information includes at least one second power control parameter, and one second power control parameter is related to at least one of: a channel type of uplink transmission, a service type of uplink transmission, transmission content of uplink transmission, a beam corresponding to uplink transmission, a carrier corresponding to uplink transmission, and a BWP corresponding to uplink transmission. By using this method, power control parameters can be configured based on different granularities, achieving more precise uplink transmit power control.

In a possible embodiment, the channel type includes at least one of a PUSCH, a PUCCH, a PRACH, and a SRS; and the service type includes at least one of an eMBB, URLLC, and eMTC. The channel type and the service type are not limited in this application. The manner described in this possible embodiment is merely used as an example, and this application is not limited thereto during specific implementation.

In a possible embodiment, the second power control parameter information is at least one of third power control parameter information and fourth power control parameter information, where the third power control parameter information is determined based on a first interference cancelation capability of the network device, and the fourth power control parameter information is determined based on a second interference cancelation capability of the network device. By using this method, a plurality of sets of power control parameters may be configured for one UE, and the uplink transmit power may be adjusted based on a self-interference cancelation capability of the network device or other constraints and by using different power control parameters in different cases, to satisfy an uplink power control requirement in a full-duplex networking scenario.

In a possible embodiment, the full-duplex resource includes at least one of a time domain resource, a frequency domain resource, and a space domain resource. The time domain resource includes a super frame, a frame, a slot, a subframe, a micro-subframe, a micro-slot, an OFDM symbol, a mini-slot, or a mini-subframe, or includes any combination of a super frame, a frame, a slot, a subframe, a micro-subframe, a micro-slot, an OFDM symbol, a mini-slot, and a mini-subframe; the frequency domain resource includes a CCE, a CORSET, a PRB, a BWP, or a carrier; and the space domain resource includes a beam, a beam pair, a beam group, or an antenna port. A division manner of the full-duplex resource is not limited in this application. The manner described in this possible embodiment is merely used as an example, and this application is not limited thereto during specific implementation.

In a possible embodiment, the network device sends the power control parameter information of the uplink transmit power to the UE by using at least one of RRC signaling, MAC signaling, or physical layer signaling.

In a possible embodiment, the first power control parameter information includes fifth power control parameter information and sixth power control parameter information, where the fifth power control parameter information is used to calculate an uplink transmit power for data transmission on an uplink non-full-duplex resource, and the sixth power control parameter information is used to calculate an uplink transmit power for data transmission on a flexible duplex resource. By using this method, the non-full-duplex resource is further divided into the uplink non-full-duplex resource and the flexible duplex resource. In this case, different power control parameters are configured for the uplink non-full-duplex resource and the flexible duplex resource.

In a possible embodiment, the network device sends first indication information to the UE, where the first indication information includes closed-loop power control process indication information, and the closed-loop power control process indication information is used to indicate that a closed-loop power control process includes a closed-loop power control process used for full-duplex. By using this method, after determining that a plurality of closed-loop power control processes are configured, the UE can differentiate, in the closed-loop power control process in an accumulation mode, between accumulative closed-loop power control parameters corresponding to different resource types, so that an uplink power control process is more accurate.

In a possible embodiment, the first indication information further includes power control adjustment status indication information, where the power control adjustment status indication information is used to indicate a value range of the closed-loop power control process indication information.

Correspondingly, this application further provides a power control apparatus. The apparatus can implement the power control method according to the second aspect. For example, the apparatus may be a network device, and can implement the foregoing method by using software or hardware, or by using hardware executing corresponding software.

In a possible embodiment, the apparatus may include a processor and a memory. The processor is configured to support the apparatus in executing corresponding functions in the method according to the first aspect. The memory is configured to be coupled with the processor, and stores program instructions and data necessary for the apparatus. In addition, the apparatus may further include a communications interface, configured to support communication between the apparatus and another network element. The communications interface may be a transceiver.

In a possible embodiment, the apparatus may include a sending module. The sending module is configured to send power control parameter information of an uplink transmit power to UE, where the power control parameter information includes parameter information used to calculate an uplink transmit power for data transmission on a non-full-duplex resource and parameter information used to calculate an uplink transmit power for data transmission on a full-duplex resource.

This application further provides a computer storage medium. The computer storage medium stores a computer program instruction; and when the program instruction is run on a computer, the computer is enabled to perform the method according to any one of the foregoing aspects.

This application further provides a computer program product. When the computer program product is run on a computer, the computer is enabled to perform the method according to any one of the foregoing aspects.

Any computer storage medium or computer program product provided above is used to perform the corresponding method provided above. Therefore, for beneficial effects that can be achieved by the computer storage medium or computer program product, refer to the beneficial effects of a corresponding solution in the corresponding method provided above. Details are not described herein again.

DESCRIPTION OF EMBODIMENTS

Figure 1:
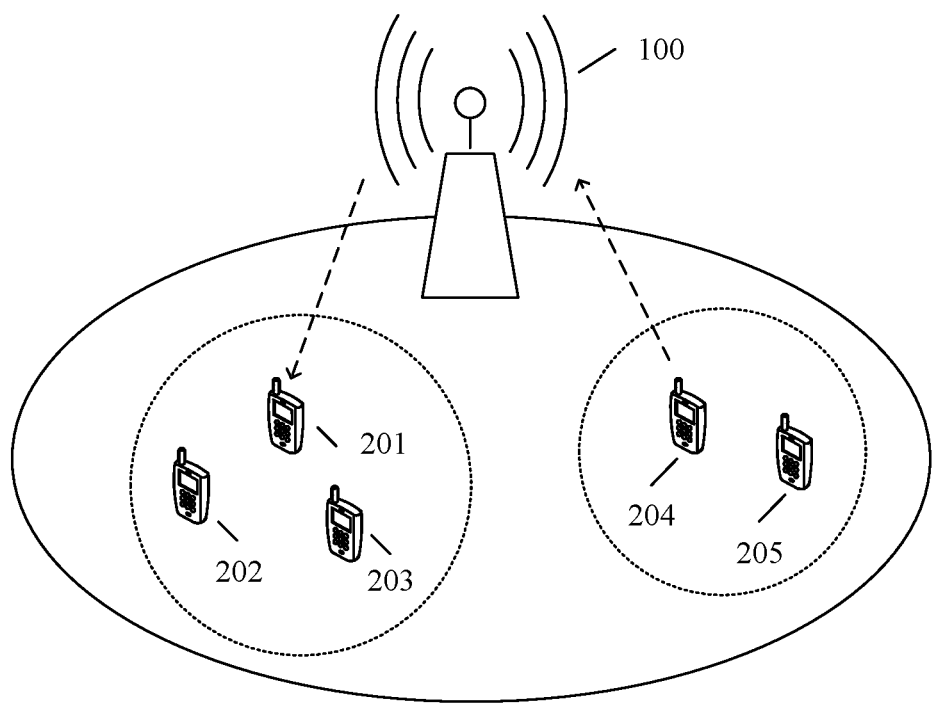
FIG. 1 is a schematic diagram of a system architecture to which a technical solution provided in an embodiment of this application is applicable.

With reference to the accompanying drawings, the following details a power control method and a device that are provided in the embodiments of this application.

Data transmission directions in a wireless communications system are classified into an uplink transmission direction and a downlink transmission direction. A direction in which a terminal device sends data to a network device is the uplink transmission direction, and power control for the uplink transmission direction is uplink power control. Uplink power control is quite important. Through uplink power control, the terminal device can ensure quality of uplink sending data, and can reduce interference caused to another terminal device in the system, thereby prolonging a battery life of the terminal device.

Uplink power control in an long term evolution (LTE) system and a next radio (NR) system mainly includes power control and configuration for uplink transmission channels such as a physical uplink shared channel (PUSCH), a physical uplink control channel (PUCCH), a physical random access channel (PRACH), and a sounding reference signal (SRS) channel.

Using a PUSCH channel as an example, the network device may configure a PUSCH power control parameter by using radio resource control (RRC) signaling and downlink control information (DCI).

The 3rd Generation Partnership Project (3GPP) defines power control formulas for various channel types in the NR system in the TS 38.213 protocol. For example, a power control formula for a PUSCH channel is defined in clause 7.1.1 in TS 38.213. On a terminal side, an uplink transmit power for transmitting PUSCH information by user equipment (UE) by using a cell c, a carrier f, and an $i^{th}$ subframe is as follows:

estimated path loss value of the UE; and $\Delta_{TF,f,c}$ (i) is an increment value for a different modulation and coding scheme (MCS) index.

$f_{f,c}$ (i, n) is a UE-specific closed-loop power control parameter. The network device may adjust $f_{f,c}$ (i, n) within a predefined range by using a transmit power control (TPC) command, to adjust the uplink transmit power of the UE. Based on configurations, closed-loop power control modes may be classified into two types: an absolute mode and an accumulation mode. In the absolute mode, $f_{f,c}$ (i, n)= $\delta_{PUSCH,f,c}$ (i-$K_{PUSCH}$); to be specific, $f_{f,c}$ (i, n) is a value of a TPC parameter $\delta_{PUSCH,f,c}$ carried in a TPC command received in an (i-$K_{PUSCH}$)$^{th}$ subframe. In the accumulation mode, $f_{f,c}$(i,n)=$f_{f,c}$(i-1, n)+$\delta_{PUSCH,f,c}$ (i-$K_{PUSCH}$); to be specific, $f_{f,c}$ (i, n) is a sum of an accumulated value of the closed-loop power control parameter in an (i-1)$^{th}$ subframe and the value of the TPC parameter $\delta_{PUSCH,f,c}$ carried in the TPC command received in the (i-$K_{PUSCH}$)$^{th}$ subframe. In the accumulation mode, an adjustment range of one TPC command is relatively small, but a transmit power adjustment value can be accumulated and a final adjustment range may be relatively large. It is a slow process for changing a transmit power by using TPC commands in the accumulation mode. Using a TPC command in the absolute mode can adjust a transmit power once in a larger range, but a transmit power adjustment value corresponding to each time cannot be accumulated. According to configurations in the prior art, a transmit power can be adjusted by at most 4 dB in the absolute mode. However, for some channel types such as a PUCCH, there is no absolute mode for a closed-loop power control process.

In the NR system, there are many full-duplex networking scenarios. Different from transmission mode such as TDD and FDD in the prior art, the network device that operates in a full-duplex mode receives data from a group of terminal devices in an uplink direction, and in the meantime, sends data to another group of terminal devices in a downlink direction. Consequently, a self-interference cancelation $$P_{PUSCH,f,c}(i, j, q_d, n) = \min\left\{\begin{array}{l}P_{CMAX,f,c}(i), \\ P_{O\_PUSCH,f,c}(j) + 10\log_{10}(2^\mu \cdot M_{RB,f,c}^{PUSCH}(i)) + \alpha_{f,c}(j) \cdot PL_{f,c}(q_d) + \Delta_{TF,f,c}(i) + f_{f,c}(i, n)\end{array}\right\}$$

j is an index of a configured parameter set {$P_{O\_PUSCH,f,c}$, $\alpha_{f,c}$}; n is an index of a configured power control adjustment status and is corresponding to different closed-loop power control procedures, where n may be 1 or 2; $q_d$ is a reference signal (RS) resource index; µ is a parameter indicative of a subcarrier spacing; $P_{CMAX,f,c}$ (i) is a maximum available transmit power of the UE; and $M_{RB,f,c}^{PUSCH}$ (i) is a bandwidth occupied by a time-frequency resource corresponding to a PUSCH corresponding to the cell c, the carrier f, and the $i^{th}$ subframe, where the time-frequency resource may be expressed in a quantity of resource blocks (resource block, RB).

$P_{O\_PUSCH,f,c}$ (j) is a power control parameter of a semi-static configuration, and includes a cell-level parameter $P_{O\_NOMINAL\_PUSCH,f,c}$ (j) and a UE-level parameter $P_{O\_UE\_PUSCH,f,c}$ (j). $P_{O\_NOMINAL\_PUSCH,f,c}$ (j) is a common value of all UEs in the cell, and represents a cell-level semi-static transmit power reference; and $P_{O\_UE\_PUSCH,f,c}$ (j) is a value specific to each UE, and represents a power offset of the UE relative to the cell-level power reference.

$\alpha_{f,c}$ (j) is a semi-static configuration parameter, and represents a path loss compensation degree; $PL_{f,c}$ ($q_d$) is an problem exists. In this case, a prior-art uplink power control method is inapplicable to the full-duplex networking scenarios in the NR system. Inapplicability of the prior-art uplink power control method may specifically be presented, but not limited to, in the following several aspects.

In one aspect, the power control parameter $P_o$ of the semi-static configuration is a power control parameter designed for a common uplink transmission mode, and the uplink transmit power of the UE satisfies requirements of the transmission modes such as TDD and FDD in the prior art. In a case in which there is a full-duplex transmission mode, if the UE transmits data with the uplink transmit power in the prior art, it is possible that the network device cannot correctly receive uplink data because of an insufficient self-interference cancelation capability of the network device.

In another aspect, in the prior art, in the accumulation mode for the closed-loop power control process, the closed-loop power control parameter $f_{f,c}$ (i, n), namely, a current value of the closed-loop power control parameter, is the sum of the accumulated value of the closed-loop power control parameter in the $(i-1)^{th}$ subframe and the value of the TPC parameter $\delta_{PUSCH,fc}$ carried in the TPC command received in the $(i-K_{PUSCH})^{th}$ subframe. In other words, the uplink transmit power for transmitting the PUSCH information in the $i^{th}$ subframe is adjusted based on an uplink transmit power for transmitting PUSCH information in the $(i-1)^{th}$ subframe. After the full-duplex mode is used, a resource type of the $i^{th}$ subframe may be different from that of the $(i-1)^{th}$ subframe. For example, the $i^{th}$ subframe is a full-duplex resource and is used for full-duplex multiplex transmission, and the $(i-1)^{th}$ subframe is a non-full-duplex resource and is used for uplink transmission. Uplink transmit powers for transmitting uplink data on the full-duplex resource and the non-full-duplex resource need to be set differently. Then, the uplink transmit power that is corresponding to the $i^{th}$ subframe and that is obtained through adjustment based on the uplink transmit power corresponding to the $(i-1)^{th}$ subframe is inaccurate. Consequently, it is possible that the network device cannot correctly receive uplink data in the $i^{th}$ subframe.

It should be noted that the foregoing uses a PUSCH channel as an example for description. Actually, a same problem exists in uplink power control processes for other types of uplink transmission channels such as a PUCCH channel, a PRACH channel, and an SRS channel, and details are not described herein again. However, it does not indicate that the solutions described in this application are applicable only to the PUSCH channel. The solutions described in this application are applicable to uplink power control for all types of uplink transmission channels in the full-duplex networking scenarios.

Based on the foregoing problem, this application provides a power control method and a device. Basic principles of the power control method and the device are: For uplink transmission performed on a full-duplex resource and a non-full-duplex resource, different power control parameters are allocated and different closed-loop power control processes are designed, to implement uplink transmit power control in a full-duplex networking scenario.

The technical solutions provided in this application can be applied to various communications system involving full-duplex networking scenarios, for example, an existing communications system using full-duplex networking, a fifth generation (5G) NR system, a future evolved system, or a plurality of integrated communications system. A plurality of application scenarios may be included, for example, machine to machine (M2M), device to machine (D2M), macro-micro communication, enhanced mobile broadband (eMBB), ultra-reliable and low latency communications (URLLC), and massive machine type communication (mMTC). These scenarios may include but are not limited to: a scenario of communication between UEs, a scenario of communication between network devices, and a scenario of communication between a network device and UE. The technical solutions provided in the embodiments of this application can also be applied to communication between UEs, communication between network devices, or other scenarios in a 5G communications system.

The technical solutions provided in the embodiments of this application can be applied to a system architecture shown in FIG. 1. The system architecture may include a network device 100 and UEs 201 to 205 connected to the network device 100. The network device 100 is configured to provide a wireless access service for the UEs 201 to 205. Specifically, the network device 100 is corresponding to a service coverage area (an elliptic-shaped area shown in FIG. 1), and UE that enters the area may communicate with the network device 100 by using a wireless signal, to receive the wireless access service provided by the network device 100.

The network device 100 may be a device that can communicate with the UEs 201 to 205. The network device 100 may be a relay node, an access point, or the like. The network device 100 may be a base transceiver station (BTS) in a global system for mobile communications (GSM) or a code division multiple access (CDMA) network, may be an NB (e.g., a NodeB) in wideband code division multiple access (WCDMA), or may be an eNB or an eNodeB (e.g., an evolutional NodeB) in LTE. Alternatively, the network device 100 may be a wireless controller in a cloud radio access network (CRAN) scenario. Alternatively, the network device 100 may be a network device in a future 5G network, for example, a transmission point (TRP), or a network device in a future evolved PLMN network; or may be a wearable device, a vehicle-mounted device, or the like.

The UEs 201 to 205 may be referred to as user equipment UE, access terminals, UE units, UE stations, mobile stations, mobile consoles, remote stations, remote terminals, mobile devices, UE terminals, terminals, wireless communications devices, UE agents, UE apparatuses, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved PLMN network, or the like.

It should be noted that the system architecture shown in FIG. 1 is merely used as an example, but is not used to limit the technical solutions in this application. A person skilled in the art should understand that in a specific implementation process, the system architecture may further include another device, and quantities of network devices and UEs can be configured depending on a specific requirement.

The system architecture shown in FIG. 1 may be applied to a full-duplex networking scenario. The network device 100 has a full-duplex capability and can perform data receiving and sending by using a same frequency band at the same time; and the UEs 201 to 205 have no full-duplex capability and communicate with the network device 100 in a TDD mode, an FDD mode, or another non-duplex mode. For example, the UEs communicate with the network device 100 in the TDD mode, and the network device 100 may group UEs that use a same frequency resource within the coverage area. A same transmission direction is used for UE in one group to reduce interference between UEs, and UEs in different groups may perform transmission in different directions. For example, UE in a group performs uplink transmission to send data, and UE in another group performs downlink transmission to receive data, forming a full-duplex mode in which the network device 100 performs data receiving and sending at the same time. The network device 100 may group UEs based on interference information of the UEs: classify UEs between which interference is small into different groups as a match pair, and classify UEs between which interference is relatively large into one group. Alternatively, the network device 100 may group UEs based on service directions: classify UEs having relatively heavy downlink services into one group, and classify UEs having relatively heavy uplink services into another group. Certainly, the network device 100 may alternatively group UEs in another manner. This is not limited in this application. For example, the network device 100 may classify the UEs 201 to 205 into two groups: the UEs 201 to 203 form a first group and the UEs 204 and 205 form a second group. In a same time unit, the network device 100 sends data to the UE 201, and receives uplink data from the UE 204.

The following interprets and describes some terms in this application, to help readers understand this application.

That the network device 100 is a gNB in the NR system is used as an example.

1. Resource Unit

In the NR system, radio resources may include a time domain resource, a frequency domain resource, and a space domain resource. The time domain resource may include at least one or any combination of a plurality of the following resources: a super frame, a frame, a slot, a subframe, a micro-subframe, a micro-slot, an OFDM symbol, a mini-slot, or a mini-subframe; the frequency domain resource may include at least one of: a CCE, a CORSET, a PRB, a BWP, or a carrier; and the space domain resource may include at least one of a beam, a beam pair, a beam group, or an antenna port.

Resources used for data transmission include at least one of the time domain resource, the frequency domain resource, and the space domain resource. For example, in time domain, one subframe, one slot, one symbol, or one mini-slot may be used as a resource unit; in frequency domain, one CCE, one BWP, or one carrier may be used as a resource unit; and in space domain, one beam or one antenna port may be used as a resource unit. For example, one slot corresponding to one beam and one carrier may be used as a resource unit; one symbol corresponding to one beam and one carrier may be used as a resource unit; or one symbol corresponding to one antenna port and one BWP may be used as a resource unit. It should be noted that during resource unit division, at least one of the time domain resource, the frequency domain resource, and the space domain resource needs to be considered. For example, when there is only one beam in space domain and only one carrier in frequency domain, only a time domain may be considered, and one subframe, one slot, one symbol, or one mini-slot may be used as a resource unit. When there is only one beam in space domain and a plurality of carriers in frequency domain, one subframe, one slot, one symbol, or one mini-slot corresponding to a same carrier resource may be used as a resource unit. When there are a plurality of beams in space domain and a plurality of carriers in frequency domain, one subframe, one slot, one symbol, or one mini-slot corresponding to a same beam and a same carrier resource may be used as a resource unit. The foregoing is merely used as an example for describing a resource unit division manner. In actual application, a resource unit granularity may be obtained through division based on a radio resource configuration by using the time domain resource, the frequency domain resource, and the space domain resource. A specific resource unit division manner is not limited in this application. In addition, there may be a plurality of resource unit division manners. For example, one slot corresponding to a same beam and a same carrier resource may be used as a resource unit, and one symbol of another slot corresponding to a same beam and a same carrier resource may be used as another resource unit. This is not limited in the embodiments of this application.

2. Resource Type

For radio resources, a semi-static format configuration and a dynamic format configuration are supported in the NR system. The following uses an example for description in which one slot is a resource unit.

The semi-static format configuration means that the gNB notifies UE of a transport format of each slot by using a semi-static signaling indication (for example, by using RRC signaling). The transport format may include three states: UL, DL, and X. UL represents uplink, DL represents downlink, and X represents a flexible state. The UE neither performs receiving nor performs sending in a slot in the flexible state. The semi-static format configuration is at a cell-level. To be specific, all UEs in a cell receive a same slot configuration.

The dynamic format configuration means that the gNB notifies UE of a transport format of one slot or several slots by using DCI signaling. The DCI signaling is carried on a group common—PDCCH (GC-PDCCH). The UE detects the GC-PDCCH channel based on a listening period configured by the gNB, and receives the DCI signaling. The transport format notified by using DCI signaling may override a transport format, in the semi-static signaling indication, of a slot configured as being in a flexible state.

An example is used for description in which in the system architecture shown in FIG. 1, the gNB configures a transport format of each slot corresponding to a specific beam and a specific carrier.

The gNB first configures transport formats of 10 slots separately for the UE 201 and the UE 204 by using a semi-static signaling indication, where a slot 0 is corresponding to DL, and slots 1 to 9 are corresponding to X. The transport formats of the 10 slots of the UE 201 and the transport formats of the 10 slots of the UE 204 are listed in Table 1. Further, the gNB indicates the transport formats of the 10 slots of the UE 201 and the transport formats of the 10 slots of the UE 204 separately by using DCI signaling. For example, the gNB indicates the transport formats of the 10 slots of the UE 201 as DDDDDUUUUD by using DCI signaling, and indicates the transport formats of the 10 slots of the UE 204 as DDUUUUDDDD by using DCI signaling. In this case, the transport formats of the 10 slots of the UE 201 and the transport formats of the 10 slots of the UE 204 are listed in Table 2.

TABLE 1

| Slot | 0 | 1 | 2 | 3 | 4 | 5 | 6 | 7 | 8 | 9 |
|---|---|---|---|---|---|---|---|---|---|---|
| UE 201 | DL | X | X | X | X | X | X | X | X | X |
| UE 204 | DL | X | X | X | X | X | X | X | X | X |

TABLE 2

| Slot | 0 | 1 | 2 | 3 | 4 | 5 | 6 | 7 | 8 | 9 |
|---|---|---|---|---|---|---|---|---|---|---|
| UE 201 | DL | DL | DL | DL | DL | UL | UL | UL | UL | DL |
| UE 204 | DL | DL | UL | UL | UL | UL | DL | DL | DL | DL |

As listed in Table 2, the gNB side performs uplink transmission and downlink transmission at the same time in slots 2, 3, 4, 6, 7, and 8, that is, in a full-duplex mode. In the full-duplex mode, there may be different types of transmission performed by UE in different slots. In the foregoing example, the slots of the two UEs may be classified into four types. A first type of slot is a slot with a semi-static configuration, for example, a slot 0, in which transport formats of the slot (corresponding to a specific beam and a specific carrier) of all the UEs in the cell are the same. A second type of slot is downlink codirectional transmission slots with a dynamic configuration, for example, a slot 1 and a slot 9, where both the UE 201 and the UE 204 perform downlink transmission in the slots. A third type of slot is uplink codirectional transmission slots with a dynamic configuration, for example, a slot 5, where both the UE 201 and the UE 204 perform uplink transmission in the slot. A fourth type of slot is full-duplex slots with a dynamic configuration, for example, the slots 2, 3, 4, 6, 7, and 8, where transmission directions of the UE 201 and the UE 204 are different in each of these slots. The third type of slot and the fourth type of slot are resources used for uplink transmission. The third type of slot is an uplink non-full-duplex resource, and the fourth type of resource is a full-duplex resource.

Further, in a mobile communications system, for different network devices, uplink/downlink traffic requirements differ greatly specific to different service types. Some services require more uplink transmission resources, while some services need to be allocated with more downlink transmission resources. By using a flexible duplex technology, uplink/downlink transmission resources can be adaptively allocated based on distribution of uplink/downlink services. For example, by using a flexible frequency band technology, some uplink frequency bands in an FDD system are configured as "flexible frequency bands". In actual application, the "flexible frequency bands" are allocated for uplink transmission or downlink transmission based on the distribution of the uplink/downlink services, so that uplink/downlink spectrum resources match uplink/downlink service requirements, thereby improving spectrum utilization. In such an allocation manner, adjacent network devices use different transmission directions on a same time domain resource/frequency domain resource. Consequently, for a network device, uplink transmission of UE is faced with interference caused by downlink transmission of a surrounding network device. A flexible duplex resource in this application is an uplink transmission resource in the flexible duplex technology, where the uplink transmission resource is faced with interference caused by downlink transmission of a surrounding network device. Based on different quantities of downlink transmission resources configured for surrounding network devices, interference levels also differ, and therefore the flexible duplex resource may further be divided into flexible duplex resources at different interference levels.

In summary, both the uplink non-duplex resource and the flexible duplex resource are non-full-duplex resources, and a resource type used for uplink transmission includes the full-duplex resource and the non-full-duplex resource. It should be noted that in actual application, based on specific implementation of a transmission mode, uplink transmission resources may alternatively be classified according to another criterion, and a non-full-duplex resource may alternatively include another type of resource. The classification manner in the embodiments of this application is merely used as an example, but does not constitute any limitation on the classification manner.

3. Power Control Parameter

A power control parameter is a related parameter used by UE to calculate an uplink transmit power. The network device may configure the power control parameter to configure the uplink transmit power for the UE.

4. The term "a plurality of" in this specification means two or more. In this specification, the terms "first" and "second" are intended to distinguish between different objects but do not indicate a particular order of the objects. For example, first power control parameter information and second power control parameter information are merely used to differentiate between different power control parameter information, but do not limit a sequential order of the different power control parameter information. The term "and/or" in this specification describes only an association relationship for describing associated objects and represents that three relationships may exist. For example, A and/or B may represent the following three cases: Only A exists, both A and B exist, and only B exists.

In addition, in the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example" or "for example" or the like is intended to present a relative concept in a specific manner.

Figure 2:
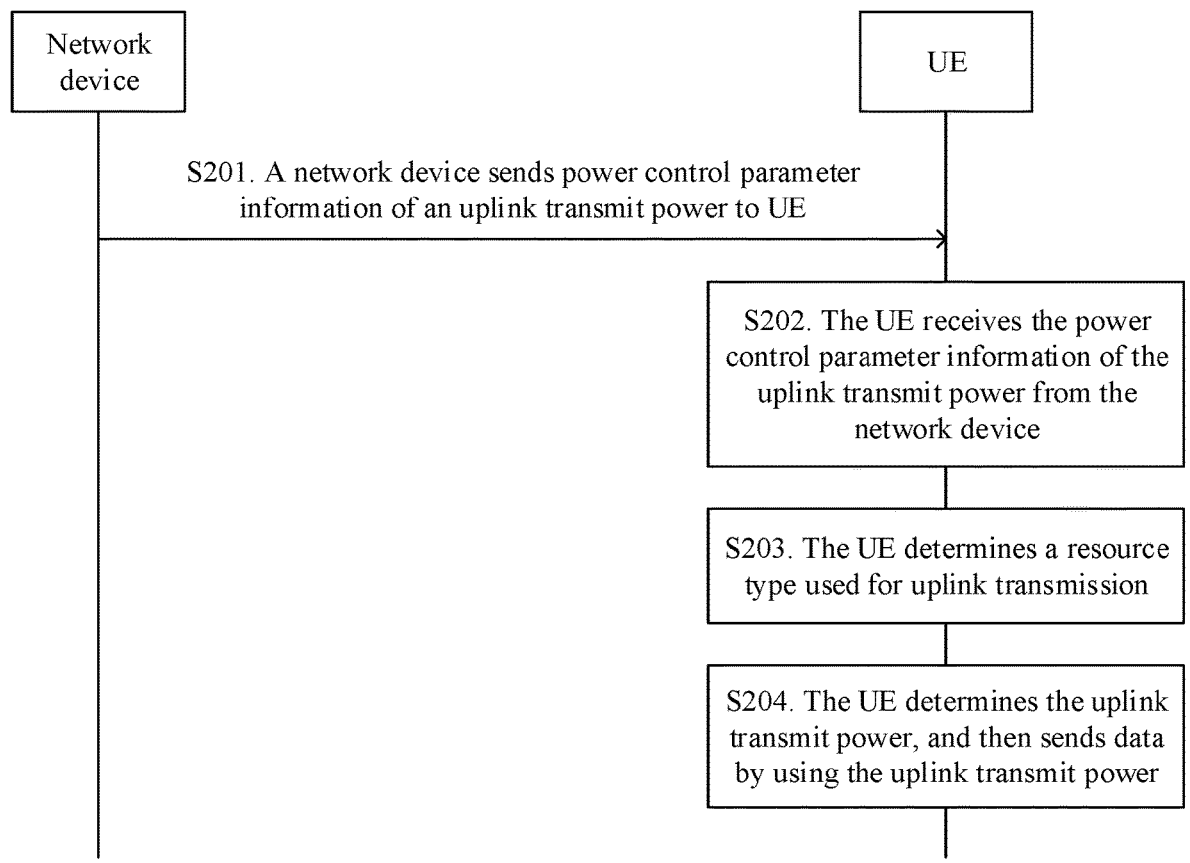
FIG. 2 is a schematic interaction diagram of a power control method according to an embodiment of this application.

An embodiment of this application provides a power control method. The method is applied to the communications system shown in FIG. 1. As shown in FIG. 2, the method may include S201 to S204.

S201. A network device sends power control parameter information of an uplink transmit power to UE.

Optionally, the network device may configure the power control parameter information for the UE by using semi-static signaling. For example, the network device sends the power control parameter information to the UE by using RRC signaling, MAC signaling, or physical layer signaling.

The power control parameter information includes first power control parameter information and second power control parameter information, where the first power control parameter information is used to calculate an uplink transmit power for data transmission on a non-full-duplex resource, and the second power control parameter information includes a parameter for calculating an uplink transmit power for data transmission on a full-duplex resource.

The following uses an example for description in which a power control parameter of an uplink transmit power for transmitting data on a PUSCH is configured.

It should be noted that a PUSCH uplink transmit power described below may be considered as an uplink transmit power for performing PUSCH data transmission by the UE in a cell c by using a resource unit i. The resource unit i may be any resource unit, and the cell c may be any cell served by the network device, for example, a gNB. For ease of description, the following formula for calculating the PUSCH uplink transmit power does not involve c.

As described above, the uplink transmit power for performing PUSCH data transmission by the UE by using the resource unit i is as follows:

$$P(i, j, q_d, n) = \min\left\{ \begin{array}{l} P_{CMAX}(i), \\ P_O(j) + 10\log_{10}(2^\mu \cdot M_{RB}(i)) + \alpha(j) \cdot PL(q_d) + \Delta_{TF}(i) + f(i, n) \end{array} \right\}$$

j is an index of a configured parameter set $\{P_O, \alpha\}$; n is an index of a configured power control adjustment status and is corresponding to different closed-loop power control procedures, where n may be 1 or 2; $q_d$ is a RS resource index; $P_{CMAX}(i)$ is a maximum available transmit power of the UE; and $M_{RB}(i)$ is a bandwidth occupied by a time-frequency resource corresponding to a PUSCH in the resource unit i, where the time-frequency resource may be expressed in a quantity of resource blocks (resource block, RB).

$P_O(j)$ is a power control parameter of a semi-static configuration, represents a target power of the UE, and includes a cell-level parameter $P_{O\_NOMINAL\_PUSCH}$ (j) and a UE-level parameter $P_{O\_UE\_PUSCH}$ (j) α(j) is a semi-static configuration parameter, and represents a path loss compensation degree.

$PL_{f,c}$ ($q_d$) is an estimated path loss value of the UE; and $\Delta_{TF}$ (i) is an increment value for a differentMCS index.

f(i,n) is a UE-specific closed-loop power control parameter.

The network device may configure the uplink transmit power P by configuring the power control parameter $P_O$ and the closed-loop power control parameter f. Certainly, the network device may alternatively configure the uplink transmit power P by configuring another parameter. For ease of description, this application merely uses $P_O$ and f as an example for description.

In an implementation, the uplink transmit power is P, the power control parameter is $P_O$, and the network device sends configuration information of $P_O$ to the UE, so that the UE calculates the uplink transmit power P based on $P_O$.

In an example of this application, when the network device configures the power control parameter information by using an RRC IE, the configuration information may be listed in Table 3.

TABLE 3

| | |
|---|---|
| $P_{O\_1}$ | Used for a non-full-duplex resource |
| $P_{O\_2}$ | Used for a full-duplex resource |

$P_{O\_1}$ is a first power control parameter, and $P_{O\_2}$ is a second power control parameter. $P_{O\_1}$ may be a UE-specific first power control parameter, and $P_{O\_2}$ may be a UE-specific second power control parameter. Alternatively, $P_{O\_1}$ may be a cell-specific first power control parameter, and $P_{O\_2}$ may be a cell-specific second power control parameter.

Optionally, the second power control parameter may further be divided based on a characteristic of uplink transmission of the UE. Optionally, the second power control parameter may be configured based on at least one of: a channel type of uplink transmission, a service type of uplink transmission, transmission content of uplink transmission, a beam corresponding to uplink transmission, a carrier corresponding to uplink transmission, and a BWP corresponding to uplink transmission.

In an implementation, a corresponding second power control parameter is configured for each channel type based on the channel type of the uplink transmission.

In an example of this application, when the network device configures the power control parameter information by using an RRC IE, the configuration information may be listed in Table 4.

TABLE 4

| | |
|---|---|
| $P_{O\_1}$ | Used for a non-full-duplex resource |
| $P_{O\_2\_PUSCH}$ | Used for a full-duplex resource for a PUSCH channel |
| $P_{O\_2\_PUCCH}$ | Used for a full-duplex resource for a PUCCH channel |
| $P_{O\_2\_PRACH}$ | Used for a full-duplex resource for a PRACH channel |
| $P_{O\_2\_SRS}$ | Used for a full-duplex resource for an SRS |

Different second power control parameters are configured based on different channel types. The second power control parameter information includes four second power control parameters: $P_{O\_2\_PUSCH}$, $P_{O\_2\_PUCCH}$, $P_{O\_2\_PRACH}$, and $P_{O\_2\_SRS}$.

In an implementation, a corresponding second power control parameter is configured for each service type based on the service type of the uplink transmission.

In an example of this application, when the network device configures the power control parameter information by using an RRC IE, the configuration information may be listed in Table 5.

TABLE 5

| | |
|---|---|
| $P_{O\_1}$ | Used for a non-full-duplex resource |
| $P_{O\_2\_eMBB}$ | Used for a full-duplex resource for an eMBB service |
| $P_{O\_2\_URLLC}$ | Used for a full-duplex resource for a URLLC service |
| $P_{O\_2\_eMTC}$ | Used for a full-duplex resource for an eMTC service |

Different second power control parameters are configured based on different service types. The second power control parameter information includes three second power control parameters: $P_{O\_2\_eMBB}$, $P_{O\_2\_URLLC}$, and $P_{O\_2\_eMTC}$.

In an implementation, a corresponding second power control parameter is configured for each channel type and service type based on the channel type and service type of the uplink transmission.

In an example of this application, when the network device configures the power control parameter information by using an RRC IE, the configuration information may be listed in Table 6.

TABLE 6

| | |
|---|---|
| $P_{O\_1}$ | Used for a non-full-duplex resource |
| $P_{O\_2\_PUSCH\_eMBB}$ | Used for a full-duplex resource for a PUSCH channel and an eMBB service |
| $P_{O\_2\_PUSCH\_URLLC}$ | Used for a full-duplex resource for a PUSCH channel and a URLLC service |
| $P_{O\_2\_PUSCH\_eMTC}$ | Used for a full-duplex resource for a PUSCH channel and an eMTC service |
| $P_{O\_2\_PUCCH\_eMBB}$ | Used for a full-duplex resource for a PUCCH channel and an eMBB service |
| $P_{O\_2\_PUCCH\_URLLC}$ | Used for a full-duplex resource for a PUCCH channel and a URLLC service |
| $P_{O\_2\_PUCCH\_eMTC}$ | Used for a full-duplex resource for a PUCCH channel and an eMTC service |
| $P_{O\_2\_PRACH\_eMBB}$ | Used for a full-duplex resource for a PRACH channel and an eMBB service |
| $P_{O\_2\_PRACH\_URLLC}$ | Used for a full-duplex resource for a PRACH channel and a URLLC service |
| $P_{O\_2\_PRACH\_eMTC}$ | Used for a full-duplex resource for a PRACH channel and an eMTC service |
| $P_{O\_2\_SRS\_eMBB}$ | Used for a full-duplex resource for an SRS channel and an eMBB service |
| $P_{O\_2\_SRS\_URLLC}$ | Used for a full-duplex resource for an SRS channel and a URLLC service |
| $P_{O\_2\_SRS\_eMTC}$ | Used for a full-duplex resource for an SRS channel and an eMTC service |

Different second power control parameters are configured based on different channel types and service types. The second power control parameter information includes 12 second power control parameters: $P_{O\_2\_PUSCH\_eMBB}$, $P_{O\_2\_PUSCH\_URLLC}$, $P_{O\_2\_PUSCH\_eMTC}$, $P_{O\_2\_PUCCH\_eMBB}$, $P_{O\_2\_PUCCH\_URLLC}$, $P_{O\_2\_PUCCH\_eMTC}$, $P_{O\_2\_PRACH\_eMBB}$, $P_{O\_2\_PRACH\_URLLC}$, $P_{O\_2\_PRACH\_eMTC}$, $P_{O\_2\_SRS\_eMBB}$, $P_{O\_2\_SRS\_URLLC}$, and $P_{O\_2\_SRS\_eMTC}$.

It should be noted that the foregoing manners of configuring the second power control parameter are merely used as possible examples. In each configuration manner, another second power control parameter may further be included. For example, in a manner in which different channels are differentiated, a second power control parameter may further be configured for another channel type. In each configuration manner, a second power control parameter may alternatively be configured in another combination manner. For example, different second power control parameters are configured for the PUSCH channel based on different service types; only one second power control parameter is configured for the PUCCH channel without differentiating between service types. A specific manner of configuring the second power control parameter is not limited in this embodiment of this application. In specific implementation, the second power control parameter may be configured based on the at least one of: the channel type of the uplink transmission, the service type of the uplink transmission, the transmission content of the uplink transmission, the beam corresponding to the uplink transmission, the carrier corresponding to the uplink transmission, and the BWP corresponding to the uplink transmission. This is not limited in this embodiment of this application.

Optionally, in consideration of factors such as carrier space, different second power control parameters may alternatively be configured based on different numerologies numerologies. Alternatively, different second power control parameter information is hierarchically set for different UE groups specific to different cells. This is not limited in this embodiment of this application.

Optionally, the network device may determine, based on self-interference cancelation capabilities of the network device, a plurality of groups of power control parameter information used for the full-duplex resource. For example, the network device determines third power control parameter information based on a maximum interference cancelation capability of the network device, and determines fourth power control parameter information based on a minimum interference cancelation capability of the network device. The maximum interference cancelation capability may be determined based on a relatively high self-interference cancelation capability, and the minimum interference cancelation capability may be determined based on a relatively low self-interference cancelation capability. For example, the network device may determine the interference cancelation capabilities of the network device based on at least one of: magnitude of a path loss, an average receive power value of the UE, and a received signal strength value.

Optionally, the network device selects the third power control parameter information or the fourth power control parameter information as the second power control parameter information, and sends the second power control parameter information to the UE.

Optionally, the network device may alternatively send the third power control parameter information and the fourth power control parameter information that are used as the second power control parameter information to the UE, and then the UE selects, from the second power control parameter information, the third power control parameter information or the fourth power control parameter information for calculating the uplink transmit power. That the UE selects, from the second power control parameter information, the third power control parameter information or the fourth power control parameter information for use may be instructing, based on further instruction information from the network device, the UE to use the third power control parameter information or the fourth power control parameter information, or may be based on autonomous selection of the UE. Autonomous selection of the UE may be performed based on a power of the UE itself. For example, when the power is limited, the third power control parameter information is selected for use; or when the power is relatively sufficient, the fourth power control parameter information is selected for use.

In an example of this application, when the network device configures the power control parameter information by using an RRC IE, the configuration information may be listed in Table 7.

TABLE 7

| | | | |
|---|---|---|---|
| $P_{O\_2\_eMBB}$ | Used for a full-duplex resource for an eMBB service | $P_{O\_2\_eMBB}'$ | Used for a full-duplex resource for an eMBB service |
| $P_{O\_2\_URLLC}$ | Used for a full-duplex resource for a URLLC service | $P_{O\_2\_URLLC}'$ | Used for a full-duplex resource for a URLLC service |
| $P_{O\_2\_eMTC}$ | Used for a full-duplex resource for an eMTC service | $P_{O\_2\_eMTC}'$ | Used for a full-duplex resource for an eMTC service |

The third power control parameter information includes three third power control parameters: $P_{O\_2\_eMBB}$, $P_{O\_2\_URLLC}$, and $P_{O\_2\_eMTCC}$. The fourth power control parameter information includes three fourth power control parameters: $P_{O\_2\_eMBB}'$, $P_{O\_2\_URLLC}'$, and $P_{O\_2\_eMTC}'$.

In an implementation, the network device may configure a corresponding power control parameter separately for the uplink non-full-duplex resource and the flexible duplex resource. A power control parameter for calculating an uplink transmit power for data transmission on an uplink non-full-duplex resource is fifth power control parameter information, and a power control parameter for calculating an uplink transmit power for data transmission on a flexible duplex resource is sixth power control parameter information. The uplink non-full-duplex resource is usually a non-full-duplex resource for uplink transmission, that is, no flexible duplex is implemented, and all surrounding network devices perform uplink transmission on a same time-frequency resource.

In an example of this application, when the network device configures the power control parameter information by using an RRC IE, the configuration information may be listed in Table 8.

TABLE 8

| | |
|---|---|
| $P_{O\_1\_1}$ | Used for an uplink non-full-duplex resource |
| $P_{O\_1\_2}$ | Used for a flexible duplex resource |
| $P_{O\_2}$_PUSCH | Used for a full-duplex resource for a PUSCH channel |
| $P_{O\_2}$_PUCCH | Used for a full-duplex resource for a PUCCH channel |
| $P_{O\_2}$_PRACH | Used for a full-duplex resource for a PRACH channel |
| $P_{O\_2}$_SRS | Used for a full-duplex resource for an SRS |

S202. The UE receives the power control parameter information of the uplink transmit power from the network device.

Optionally, when receiving the power control parameter information of the uplink transmit power, the UE may store the power control parameter information.

S203. The UE determines a resource type used for uplink transmission.

The UE determines a resource unit used for uplink transmission. For example, the UE performs uplink transmission in a cell c and a slot i and on a carrier f based on scheduling performed by the network device.

The UE may determine, based on indication information of the network device, the resource type of the resource unit used for uplink transmission. In an implementation, the network device sends slot format indication (Slot format indication, SFI) information to the UE. The slot format indication information includes transport formats that are of the UE and UE paired with the UE and that are corresponding to the cell c, the carrier f, and the slot i. For example, for the cell c, the carrier f, and the slot i, the transport format of the UE is uplink transmission, and the transport format of the UE paired with the UE is downlink transmission; in this case, the UE may determine, based on the SFI information, that a resource type corresponding to the cell c, the carrier f, and the slot i is a full-duplex resource. For example, for the cell c, the carrier f, and the slot i, the transport format of the UE is uplink transmission; in this case, the UE may determine, based on the SFI information, that a resource type corresponding to the cell c, the carrier f, and the slot i is an uplink non-full-duplex resource. For example, for the cell c, the carrier f, and the slot i, the transport format of the UE is uplink transmission, and a transport format of a surrounding network device is downlink transmission; in this case, the UE may determine that, based on the SFI information, a resource type corresponding to the cell c, the carrier f, and the slot i is a flexible duplex resource.

S204. The UE determines the uplink transmit power, and sends data by using the uplink transmit power.

The UE determines the uplink transmit power based on the power control parameter information and the resource type used for uplink transmission. For example, if determining that the resource type used for uplink transmission is a full-duplex resource, the UE calculates the uplink transmit power based on a second power control parameter in the second power control parameter information in the power control parameter information. Further, the UE may select the corresponding second power control parameter based on the channel type of the uplink transmission, the service type of the uplink transmission, the transmission content of the uplink transmission, the beam corresponding to the uplink transmission, the carrier corresponding to the uplink transmission, and the BWP corresponding to the uplink transmission, and use the selected second power control parameter for calculating the uplink transmit power. If determining that the resource type used for uplink transmission is an uplink non-full-duplex resource (that is, the resource type is neither a flexible duplex resource nor a full-duplex resource, and is usually an uplink transmission resource), the UE calculates the uplink transmit power based on a fifth power control parameter in the fifth power control parameter information in the power control parameter information. If determining that the resource type used for uplink transmission is a flexible duplex resource, the UE calculates the uplink transmit power based on a sixth power control parameter in the sixth power control parameter information in the power control parameter information.

For example, the power control parameter information is listed in Table 5. When determining the uplink transmit power, if determining that the resource type used for uplink transmission is a non-full-duplex resource, the UE uses $P_{O\_1}$ for calculating the uplink transmit power. If determining that the resource type used for uplink transmission is a full-duplex resource, the UE further determines the service type of the uplink transmission; and if determining that the service type of the uplink transmission is a URLLC service, the UE uses $P_{O\_2\_URLLC}$ for calculating the uplink transmit power.

For example, the power control parameter information is listed in Table 8. When determining the uplink transmit power, if determining that the resource type used for uplink transmission is an uplink non-full-duplex resource, the UE uses $P_{O\_1\_1}$ for calculating the uplink transmit power. If determining that the resource type used for uplink transmission is a flexible duplex resource, the UE uses $P_{O\_1\_2}$ for calculating the uplink transmit power. If determining that the resource type used for uplink transmission is a full-duplex resource and the channel type is a PUSCH channel, the UE uses $P_{O\_2\_PUSCH}$ for calculating the uplink transmit power.

After determining the uplink transmit power, the UE uses the uplink transmit power to send the data to the network device.

Further, uplink transmit power control processes of the UE are classified into an open-loop power control process and a closed-loop power control process. In the open-loop power control process, a downlink is estimated based on an interference status of an uplink or an uplink is estimated based on an interference status of a downlink, and the link has a unidirectional characteristic and is not closed. In the closed-loop power control process, the uplink transmit power is controlled based on received feedback information of the network device. In the closed-loop power control process, when calculating the uplink transmit power, the UE further needs to determine the closed-loop power control parameter f based on a TPC parameter configured by the network device.

Figure 3:
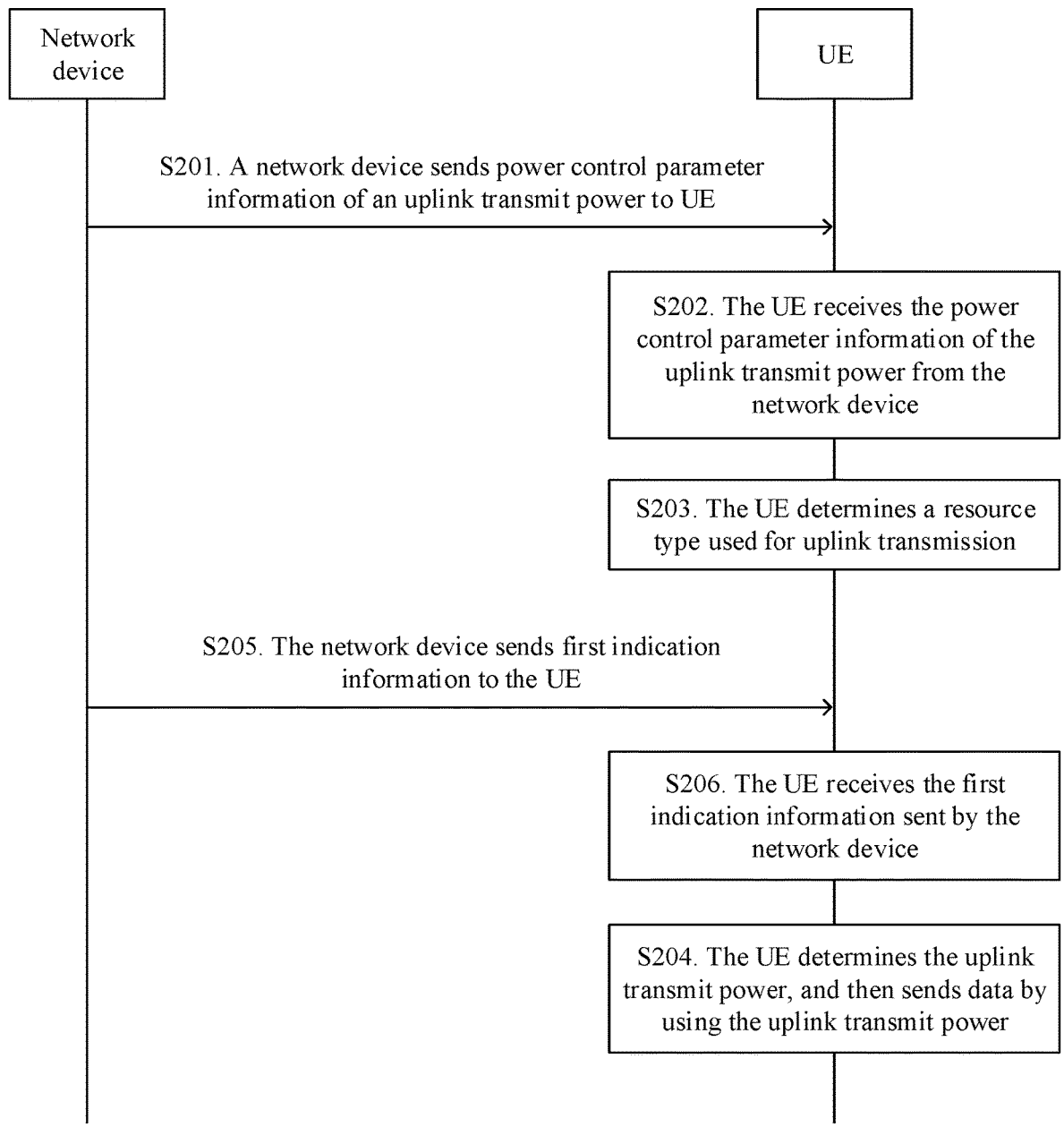
FIG. 3 is a schematic interaction diagram 2 of a power control method according to an embodiment of this application.

With reference to FIG. 2, as shown in FIG. 3, before S204, the power control method provided in this embodiment of this application may further include S205 and S206.

S205. The network device sends first indication information to the UE.

Optionally, the network device may send the first indication information to the UE by using semi-static signaling (for example, by using RRC signaling). For example, the first indication information may include closed-loop power control process indication information. The closed-loop power control process indication information in this application may also be referred to as closed-loop power control procedure indication information. The first indication information may further include power control adjustment status indication information.

If the first indication information includes the closed-loop power control process indication information, different values of the closed-loop power control process indication information may indicate different closed-loop power control processes. For example, closed-loop power control process indication information 0 is used to indicate that a closed-loop power control process is a closed-loop power control process used for full-duplex, and closed-loop power control process indication information 1 is used to indicate that a closed-loop power control process is a closed-loop power control process used for non-full-duplex. Alternatively, closed-loop power control process indication information 1 is used to indicate that a closed-loop power control process is a closed-loop power control process used for full-duplex, and closed-loop power control process indication information 0 is used to indicate that a closed-loop power control process is a closed-loop power control process used for non-full-duplex. The closed-loop power control process in the present invention may be replaced with a closed-loop power control procedure.

In an implementation, the closed-loop power control process indication information is PUSCH-closed-loop-index, and PUSCH-closed-loop-index may be set to different values to indicate different closed-loop power control processes. For example, values of PUSCH-closed-loop-index may be {0, 1}, where 0 is used to indicate that a closed-loop power control process is a closed-loop power control process used for non-full-duplex, and 1 is used to indicate that a closed-loop power control process is a closed-loop power control process used for full-duplex; certainly, it may alternatively be specified that 0 is used to indicate that a closed-loop power control process is a closed-loop power control process used for full-duplex, and 1 is used to indicate that a closed-loop power control process is a closed-loop power control process used for non-full-duplex. This is not limited in this embodiment of this application. For example, values of PUSCH-closed-loop-index may be {0, 1, 2}, where 0 is used to indicate that a closed-loop power control process is a closed-loop power control process used for full-duplex, 1 is used to indicate that a closed-loop power control process is a closed-loop power control process used for uplink non-full-duplex, and 2 is used to indicate that a closed-loop power control process is a closed-loop power control process used for flexible duplex. For example, values of PUSCH-closed-loop-index may alternatively include a value greater than or equal to 3, and are used to indicate that closed-loop power control processes are other types of closed-loop power control processes.

If the first indication information includes the power control adjustment status indication information, the power control adjustment status indication information may indicate two states, where the two states are used to indicate the closed-loop power control process used for full-duplex and the closed-loop power control process used for non-full-duplex. Alternatively, the power control adjustment status indication information may indicate three states, where the three states are used to indicate the closed-loop power control process used for full-duplex, the closed-loop power control process used for uplink non-full-duplex, and the closed-loop power control process used for flexible duplex.

For example, the power control adjustment status indication information is num-pusch-pcadjustment-states. The parameter num-pusch-pcadjustment-states may be used to indicate a value range of PUSCH-closed-loop-index. For example, if num-pusch-pcadjustment-states is 2, it indicates that the value range of PUSCH-closed-loop-index is {0, 1}; if num-pusch-pcadjustment-states is 3, it indicates that the value range of PUSCH-closed-loop-index is {0, 1, 2}. num-pusch-pcadjustment-states may be an integer greater than or equal to 1.

S206. The UE receives the first indication information sent by the network device.

Optionally, the UE may store the first indication information.

Further, the power control processes of the uplink transmit power include the open-loop power control process and the closed-loop power control process. Optionally, in the closed-loop power control process, the process of determining the uplink transmit power by the UE in S204 further includes: The UE adjusts the closed-loop power control parameter f (i, n) based on a TPC command sent by the network device, where f(i, n) is a value of the closed-loop power control parameter on the resource unit i. That the resource unit i is one subframe is used as an example. In an accumulation mode, f(i,n) is a sum of an accumulated value of the closed-loop power control parameter and a value of the TPC parameter carried in the TPC command received in an $(i-K_{PUSCH})^{th}$ subframe, that is, $f(i,n)=f(i-s,n)+\delta_{PUSCH}(i-K_{PUSCH})$. $f(i-s,n)$ is an accumulated value of the closed-loop power control parameter in an $(i-s)^{th}$ subframe.

When adjusting the closed-loop power control parameter f (i, n) based on the TPC command sent by the network device, the UE may first determine a range of the first indication information. For example, if the value range of PUSCH-closed-loop-index is {0}, the UE does not differentiate between closed-loop power control processes when adjusting f (i, n). If the value range of PUSCH-closed-loop-index is {0, 1}, the UE differentiates between the closed-loop power control process used for full-duplex and the closed-loop power control process used for non-full-duplex when adjusting f (i, n). If the value range of PUSCH-closed-loop-index is {0, 1, 2}, the UE differentiates between the closed-loop power control process used for uplink non-full-duplex, the closed-loop power control process used for full-duplex, and the closed-loop power control process used for flexible duplex when adjusting f (i, n).

For example, in the accumulation mode, if the UE determines that the value range of PUSCH-closed-loop-index is {0}, the value f(i, n) of the closed-loop power control parameter on the resource unit i is a sum of an accumulated value f (i−1,n) of the closed-loop power control parameter on a resource unit (i−1) and the value of $\delta_{PUSCH}$ received in the $(i-K_{PUSCH})^{th}$ subframe, that is, $f(i, n)=f(i-1, n)+\delta_{PUSCH}(i-K_{PUSCH})$, where s=1.

If the UE determines that the value range of PUSCH-closed-loop-index is {0, 1}, the value f (i, n) of the closed-loop power control parameter on the resource unit i is a sum of an accumulated value f(i−s, n) of the closed-loop power control parameter on a resource unit (i−s) and the value of $\delta_{PUSCH}$ received in the $(i-K_{PUSCH})^{th}$ subframe, that is, $f(i, n)=f(i-s,n)+\delta_{PUSCH}(i-K_{PUSCH})$. A resource type of the resource unit i is the same as that of the resource unit (i−s), and a value of s is determined based on the resource type of uplink transmission. For example, slots 2, 4, 7, and 8 are full-duplex resources, and slots 1 and 5 are uplink non-full-duplex resources. If i=7 and i−s=4, s is equal to 3. If i=5 and i−s=1, s is equal to 4.

It should be noted that if the resource type used by the UE for uplink transmission changes, the UE redetermines the power control parameter based on the power control parameter information and/or redetermines a type of the closed-loop power control process based on the first indication information. For example, the type of the closed-loop power control process may include the closed-loop power control process used for full-duplex and the closed-loop power control process used for non-full-duplex. For example, if determining an uplink transmit power corresponding to a full-duplex resource, namely, a resource unit 4, the UE determines a power control parameter for the full-duplex resource based on the power control parameter information. If determining an uplink transmit power corresponding to an uplink non-full-duplex resource, namely, a resource unit 5, the UE determines a power control parameter for the uplink non-full-duplex resource based on the power control parameter information. The power control parameter information listed in Table 8 is used as an example. The UE calculates the uplink transmit power corresponding to the resource unit 4 (a channel type of the resource unit 4 is a PUSCH) based on $P_{O\_2\_PUSCH}$. When calculating the uplink transmit power corresponding to the resource unit 5, the UE redetermines, from the power control parameter information, $P_{O\_1\_1}$ for calculating the uplink transmit power. In an accumulation mode closed-loop power control process, if the resource type used by the UE for uplink transmission changes, the UE redetermines the value of PUSCH-closed-loop-index.

It should be noted that a sequential order of sending the power control parameter information and the first indication information by the network device to the UE is not limited in this embodiment of this application. The network device may first send the power control parameter information to the UE, or may first send the first indication information to the UE. In other words, a sequential order of S201-S202 and S205-S206 is not limited in this embodiment of this application.

According to the power control method provided in this embodiment of this application, in a process of determining the uplink transmit power by the user equipment, different power control parameters are correspondingly used based on different resource types, and a separate power control parameter is configured for the full-duplex resource. In comparison with a prior-art power control parameter configuration method implemented without differentiating between resource types, in the power control method provided in this embodiment of this application, the user equipment can separately perform power control when using the full-duplex resource and the non-full-duplex resource for uplink transmission, and can determine different uplink transmit powers, so that the network device that operates in a full-duplex mode correctly receives data during data sending. In addition, in the closed-loop power control processes in the accumulation mode, a closed-loop power control parameter is accumulated based on a closed-loop power control parameter value corresponding to a previous resource unit whose resource type is the same as that of a current resource unit. This improves precision of the uplink transmit power in the full-duplex mode.

The foregoing mainly describes the solutions provided in the embodiments of this application from a perspective of interaction between the network device and the user equipment. It can be understood that, to implement the foregoing functions, the network device and the user equipment include corresponding hardware structures and/or software modules for executing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Functional modules of the network device and the user equipment can be obtained through division in the embodiments of this application based on the foregoing method example. For example, the functional modules may be obtained through division in correspondence with the functions, or at least two functions may be integrated into a processing module. The integrated module may be implemented in a form of hardware, or may be implemented in a form of a software functional module. It should be noted that, in the embodiments of this application, module division is used as an example, and is merely a logical function division. In actual implementation, another division manner may be used. The following uses an example for description in which the functional modules are obtained through division in correspondence with the functions.

Figure 4:
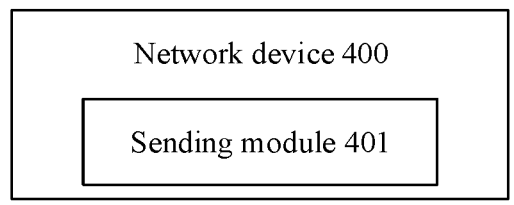
FIG. 4 is a schematic structural diagram of a network device according to an embodiment of this application.

An embodiment of this application further provides a network device. FIG. 4 is a schematic diagram of a logic structure of a network device 400 according to an embodiment of this application. As shown in FIG. 4, the network device 400 includes a sending module 401. The sending module 401 may be configured to perform S201 in FIG. 2, and may further be configured to perform S205 in FIG. 3, and/or may perform other steps described in this application.

Figure 5:
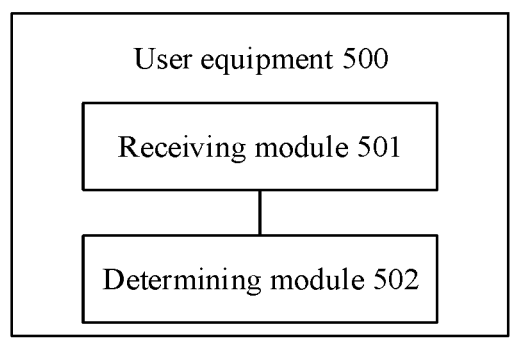
FIG. 5 is a schematic structural diagram of user equipment according to an embodiment of this application.

An embodiment of this application further provides user equipment. FIG. 5 is a schematic diagram of a logic structure of user equipment 500 according to an embodiment of this application. As shown in FIG. 5, the user equipment 500 includes a receiving module 501 and a determining module 502. The receiving module 501 may be configured to perform S202 in FIG. 2, and may further be configured to perform S206 in FIG. 3, and/or may perform other steps described in this application. The determining module 502 may be configured to perform S203 and S204 in FIG. 2 and FIG. 3, and/or may perform other steps described in this application.

All related content of various steps in the foregoing method embodiment may be cited in function descriptions of a corresponding functional module. Details are not described herein again.

In this embodiment, the network device 400 and the user equipment 500 may be presented with the functional modules obtained through division in an integrated manner. The "module" herein may be an ASIC, a processor that executes one or more software or firmware programs, a storage device, an integrated logic circuit, and/or another component capable of providing the foregoing functions.

Figure 6:
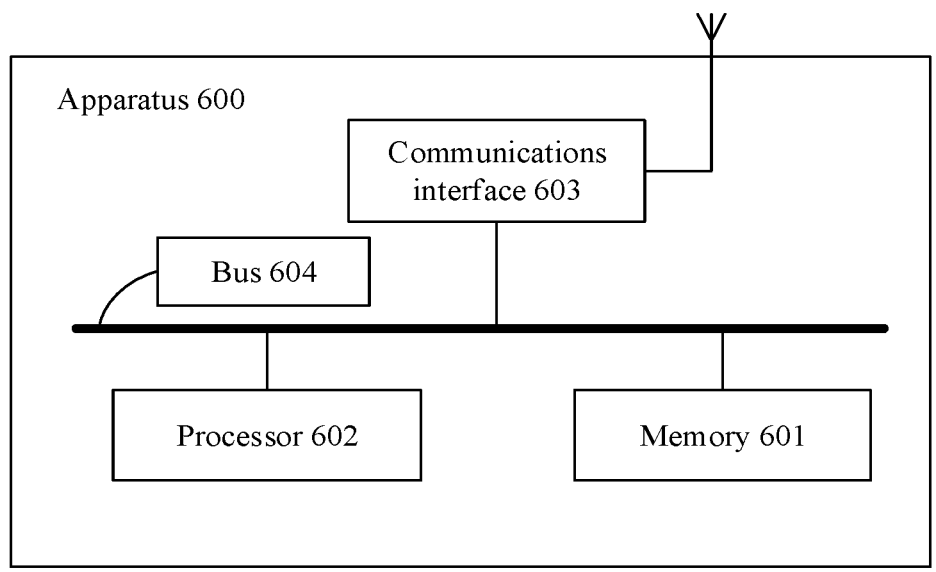
FIG. 6 is a schematic structural diagram of a power control apparatus according to an embodiment of this application.

In a simple embodiment, a person skilled in the art may figure out that a form shown in FIG. 6 may be used for the network device 400 and the user equipment 500.

As shown in FIG. 6, an apparatus 600 may include a memory 601, a processor 602, and a communications interface 603. The memory 602 is configured to store a computer executable instruction. When the apparatus 600 runs, the processor 601 executes the computer executable instruction stored in the memory 602, so that the apparatus 600 performs the power control method provided in the embodiments of this application. The memory 601, the processor 602, and the communications interface 603 are connected through a bus 604. For the specific power control method, refer to related descriptions in the foregoing and the accompanying drawings. Details are not described herein again. It should be noted that in a specific implementation process, the apparatus 600 may further include other hardware components, which are not detailed one by one in this specification.

In an example of this application, the sending module 401 in FIG. 4 may be implemented by using the communications interface 603.

In another example of this application, the determining module 502 in FIG. 5 may be implemented by using the processor 601, and the receiving module 501 may be implemented by using the communications interface 603.

The communications interface 603 may be a transceiver or a transceiver circuit. The processor 601 may be a field-programmable gate array (FPGA), an application specific integrated circuit (ASIC), a system on chip (SoC), or a central processor unit (CPU), a network processor (NP), a digital signal processor (DSP), a micro controller unit (MCU), or a programmable logic device (PLD) or another integrated chip may be used.

The apparatus provided in this embodiment of this application may be configured to perform the power control method. Therefore, for technical effects that can be achieved by the apparatus, refer to the foregoing method embodiment. Details are not described herein again.

A person of ordinary skill in the art may understand that all or some of the steps of the foregoing methods may be implemented by a program instructing relevant hardware. The program may be stored in a computer readable storage medium. The storage medium includes: a read-only memory (ROM), a random-access memory (RAM), and an optical disc.

An embodiment of this application further provides a storage medium. The storage medium may include the memory 601.

For descriptions of related content and beneficial effects of any apparatus provided above, refer to the corresponding method embodiment provided above. Details are not described herein again.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digitial video disk (DVD)), a semiconductor medium (for example, a solid-state drive (SSD)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A power control method, comprising:
   receiving, by user equipment (UE), power control parameter information of an uplink transmit power from a network device, wherein the power control parameter information comprises first power control parameter information and second power control parameter information, the first power control parameter information is used to calculate an uplink transmit power for data transmission on a non-full-duplex resource, and the second power control parameter information comprises a parameter for calculating an uplink transmit power for data transmission on a full-duplex resource; and
   determining, by the UE, an uplink transmit power based on the power control parameter information and a resource type used for uplink transmission, wherein the resource type comprises a full-duplex resource and a non-full-duplex resource, wherein the method further comprises:
   receiving, by the UE, first indication information sent by the network device, wherein the first indication information comprises closed-loop power control process indication information, and the closed-loop power control process indication information indicates that a closed-loop power control process comprises a closed-loop power control process used for full-duplex, and
   when the resource type used by the UE for uplink transmission changes, redetermining, by the UE, a type of the closed-loop power control process based on the first indication information, wherein the closed-loop power control process indication information is PUSCH-closed-loop-index and the UE redetermines a value of the PUSCH-closed-loop index.

2. The method according to claim 1, wherein the second power control parameter information comprises at least one second power control parameter, and the at least one second power control parameter is related to at least one of the following information:
   a channel type of uplink transmission;
   a service type of uplink transmission;
   transmission content of uplink transmission;
   a beam corresponding to uplink transmission;
   a carrier corresponding to uplink transmission; and
   a bandwidth part BWP corresponding to uplink transmission.

3. The method according to claim 2, wherein the channel type comprises at least one of a physical uplink shared channel (PUSCH), a physical uplink control channel (PUCCH), a physical random access channel (PRACH), and a sounding reference signal (SRS); and the service type comprises at least one of enhanced mobile broadband (eMBB), ultra-reliable and latency communications (URLLC), and enhanced machine type communications (eMTC).

4. The method according to claim 1, wherein the second power control parameter information is at least one of third power control parameter information and fourth power control parameter information, the third power control parameter information is determined based on a first interference cancellation capability of the network device, and the fourth power control parameter information is determined based on a second interference cancellation capability of the network device.

5. The method according to claim 1, wherein the full-duplex resource comprises at least one of a time domain resource, a frequency domain resource, and a space domain resource.

6. The method according to claim 5, wherein the time domain resource comprises a super frame, a frame, a slot, a subframe, a micro-subframe, a micro-slot, an orthogonal frequency division multiplexing (OFDM) symbol, a mini-slot, or a mini-subframe; and the frequency domain resource comprises a control channel element (CCE), a control resource set (CORSET), a physical resource block (PRB), a bandwidth part (BWP), or a carrier, and the space domain resource comprises a beam, a beam pair, a beam group, or an antenna port.

7. The method according to claim 1, wherein the receiving, by the UE, power control parameter information of the uplink transmit power from the network device comprises:
receiving, by the UE through at least one of radio resource control (RRC) signaling, media access control (MAC) signaling, or physical layer signaling, the power control parameter information of the uplink transmit power from the network device.

8. The method according to claim 1, wherein the first power control parameter information comprises fifth power control parameter information and sixth power control parameter information, the fifth power control parameter information is used to calculate the uplink transmit power for data transmission on an uplink non-full-duplex resource, and the sixth power control parameter information is used to calculate the uplink transmit power for data transmission on a flexible duplex resource.

9. The method according to claim 1, wherein the first indication information further comprises power control adjustment status indication information, and the power control adjustment status indication information indicates a value range of the closed-loop power control process indication information.

10. The method according to claim 1, wherein when the closed-loop power control process is in an accumulation mode, a closed-loop power control parameter is accumulated based on a closed-loop power control parameter value corresponding to a previous resource unit whose resource type is the same as that of a current resource unit, wherein the closed-loop power control parameter is used to determine the uplink transmit power.

11. A user equipment (UE), comprising:
a transceiver configured to receive power control parameter information of an uplink transmit power from a network device, wherein the power control parameter information comprises first power control parameter information and second power control parameter information, the first power control parameter information is used to calculate uplink a transmit power for data transmission on a non-full-duplex resource, and the second power control parameter information comprises a parameter for calculating an uplink transmit power for data transmission on a full-duplex resource; and
a processor, coupled with the transceiver, configured to determine an uplink transmit power based on the power control parameter information and a resource type used for uplink transmission, wherein the resource type includes a full-duplex resource and a non-full-duplex resource,
wherein the transceiver is further configured to:
receive first indication information sent by the network device, wherein the first indication information comprises closed-loop power control process indication information, and the closed-loop power control process indication information indicates that a closed-loop power control process comprises a closed-loop power control process used for full-duplex, and
wherein the processor is further configured to:
determine whether a resource type used by the UE for uplink transmission changes, and
when it is determined that the resource type used by the UE for uplink transmission changes, redetermine a type of the closed-loop power control process based on the first indication information wherein the closed-loop power control process indication information is PUSCH-closed-loop-index and the UE redetermines a value of the PUSCH-closed-loop index.

12. The UE according to claim 11, wherein the second power control parameter information comprises at least one second power control parameter, and the at least one second power control parameter is related to at least one of the following information:
a channel type of uplink transmission;
a service type of uplink transmission;
transmission content of uplink transmission;
a beam corresponding to uplink transmission;
a carrier corresponding to uplink transmission; and
a bandwidth part BWP corresponding to uplink transmission.

13. The UE according to claim 11, wherein the full-duplex resource comprises at least one of a time domain resource, a frequency domain resource, and a space domain resource.

14. The UE according to claim 11, wherein the transceiver configured to receive the power control parameter information of the uplink transmit power from the network device comprises the transceiver further configured to:
receive, through at least one of radio resource control (RRC) signaling, media access control (MAC) signaling, or physical layer signaling, the power control parameter information of the uplink transmit power from the network device.

15. The UE according to claim 11, wherein the first power control parameter information comprises fifth power control parameter information and sixth power control parameter information, the fifth power control parameter information is used to calculate the uplink transmit power for data transmission on an uplink non-full-duplex resource, and the sixth power control parameter information is used to calculate the uplink transmit power for data transmission on a flexible duplex resource.

16. The UE according to claim 11, wherein the first indication information further comprises power control adjustment status indication information, and the power control adjustment status indication information indicates a value range of the closed-loop power control process indication information.

* * * * *